June 8, 1965    J. WILLIAMSON    3,187,840
LUBRICATOR
Filed March 4, 1964    4 Sheets-Sheet 1
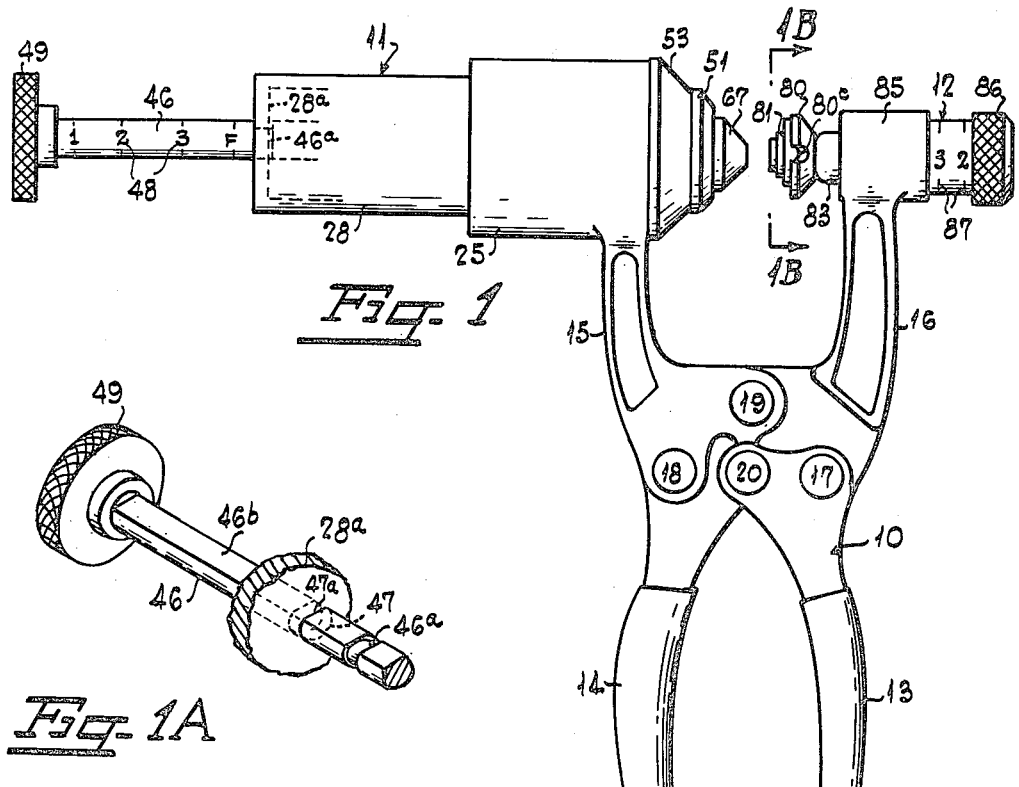
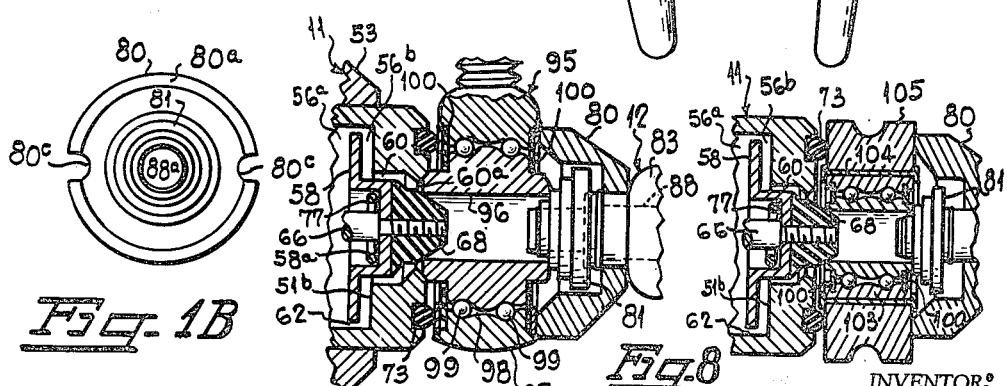
INVENTOR:
JOHN WILLIAMSON
BY Robert Brown
ATTORNEY June 8, 1965
J. WILLIAMSON
3,187,840
LUBRICATOR
Filed March 4, 1964
4 Sheets-Sheet 2
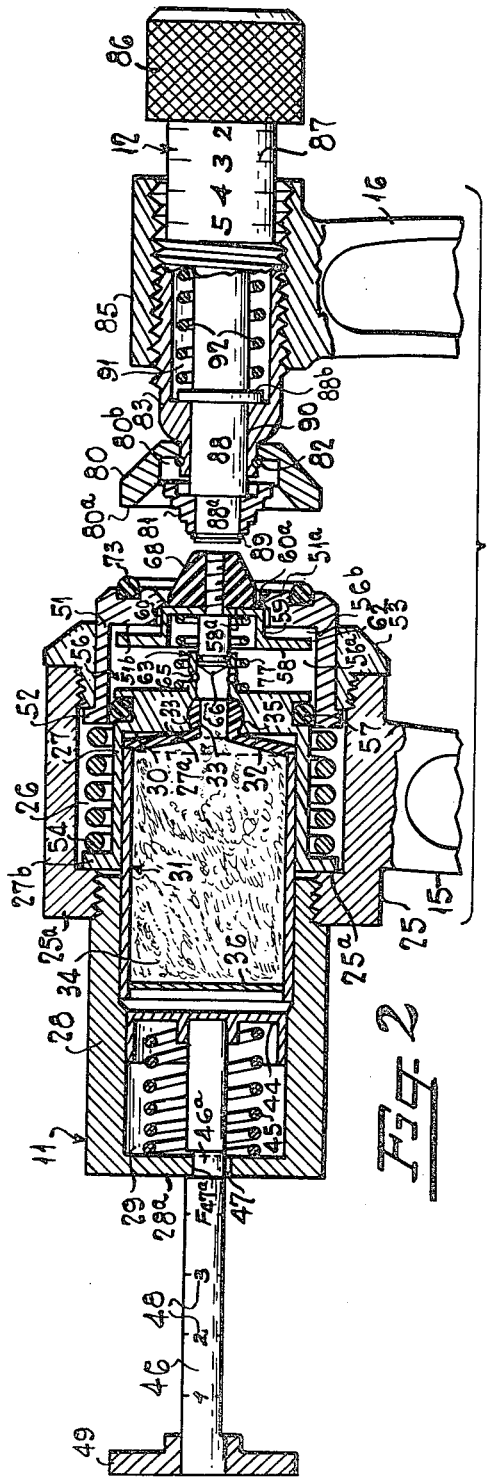
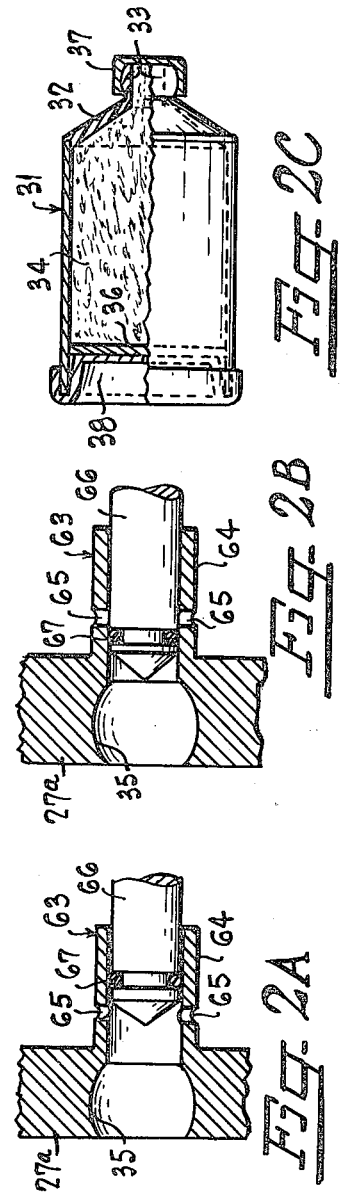
INVENTOR:
JOHN WILLIAMSON
BY Robert Brown Jr.
ATTORNEY June 8, 1965

J. WILLIAMSON 3,187,840

LUBRICATOR

Filed March 4, 1964

INVENTOR:
JOHN WILLIAMSON
BY Robert Brown jr.
ATTORNEY

June 8, 1965

J. WILLIAMSON 3,187,840

LUBRICATOR

Filed March 4, 1964

INVENTOR:
JOHN WILLIAMSON

BY Robert Brown Jr.
ATTORNEY

United States Patent Office 3,187,840
Patented June 8, 1965

3,187,840
LUBRICATOR
John Williamson, St. Louis, Mo., assignor to Drake Engineering, Inc., Southfield, Mich., a corporation of Delaware
Filed Mar. 4, 1964, Ser. No. 349,282
14 Claims. (Cl. 184—1)

This invention relates to apparatus for lubricating bearings and more especially to improvements in my copending patent applications Serial Nos. 150,744, now Patent No. 3,158,226, and 229,693, now Patent No. 3,158,227, of which the present application is a continuation-in-part.

It is an object of this invention to provide a self-contained lubrication apparatus to which lubricant is supplied automatically from a detachable cartridge and alternately with the lubrication of successive bearings.

It is another object of invention to provide an apparatus of the class described in which the lubricant supply cartridge is locked in attached position by the lubricant pressures of the apparatus.

It is another object of invention to provide a lubricating apparatus having suction means for automatically retracting the foremost end of a lubricant column from the nozzle of the apparatus immediately following the lubrication of a bearing.

It is another object of invention to provide a lubricating mechanism having means for automatically maintaining the foremost end of the lubricant column in a retracted position relative to the lubricant outlet or nozzle during the periods between successive lubricating operations thereby avoiding spill and waste of lubricant during such periods.

It is a further object of invention to provide a lubricating mechanism such as described in the preceding paragraph which operates in response to a range of lubricant pressures to expel the retracted lubricant into a bearing.

It is a still further object of invention to provide a self-contained lubricator which automatically replenishes its lubricant reservoir with an amount of lubricant substantially equal to that expelled therefrom during an immediately preceding lubricating operation. Specifically, the lubricator is composed of a lubricant supply chamber or cartridge, a lubricant receiving or reserve chamber, and a third chamber which alternately serves as a lubricant dispensing chamber and an air chamber, the three chambers being connected in series. The lubricant expelled from the receiving chamber into the dispensing chamber during a lubricating operation is automatically replenished by lubricant flowing from the supply chamber or cartridge immediately following the completion of the operation.

It is yet another object of invention to provide a lubricator of the class described having a novel combination feed, spill, and check valve for controlling the flow of lubricant between the supply cartridge and the receiving chamber.

Some of the objects of invention having been stated, other objects will appear as the description proceeds when taken in connection with the accompanying drawings, in which—

FIGURE 1 is an elevational view of a lubrication apparatus according to my invention and showing a pressure head assembly, a cooperating injector head assembly, and a manually operable clamping mechanism for moving the assemblies toward and away from one another;

FIGURE 1A is an isometric detail view of portions of the latching mechanism associated with the injector head assembly and which controls the application of a relatively low range of lubricant pressures in the lubricant supply cartridge;

FIGURE 1B is a view of the bearing contacting end of the pressure head assembly and taken along line 1B—1B in FIGURE 1;

FIGURE 2 is an enlarged longitudinal sectional view through the injector head and pressure head assemblies;

FIGURE 2A is an enlarged detail view of the combination feed, spill and check valve located between the supply cartridge and the receiving chamber, the valve being in opened position;

FIGURE 2B is a view similar to FIGURE 2A, but showing the valve in closed position;

FIGURE 2C is a detail view, partly in elevation and partly in section, of a grease supply cartridge equipped with removable sealing caps to prevent contamination and escape of grease during storage and shipment;

FIGURE 7 is a sectional view showing another application or use of the invention and in which the lubricator is fully clamped about an antifriction, ball-type bearing equipped with dirt seals, and FIGURE 8 is a sectional detail view showing still another application or use of the invention and in which the injector is employed to lubricate a pulley, also equipped with dirt seals.

Figure 3:
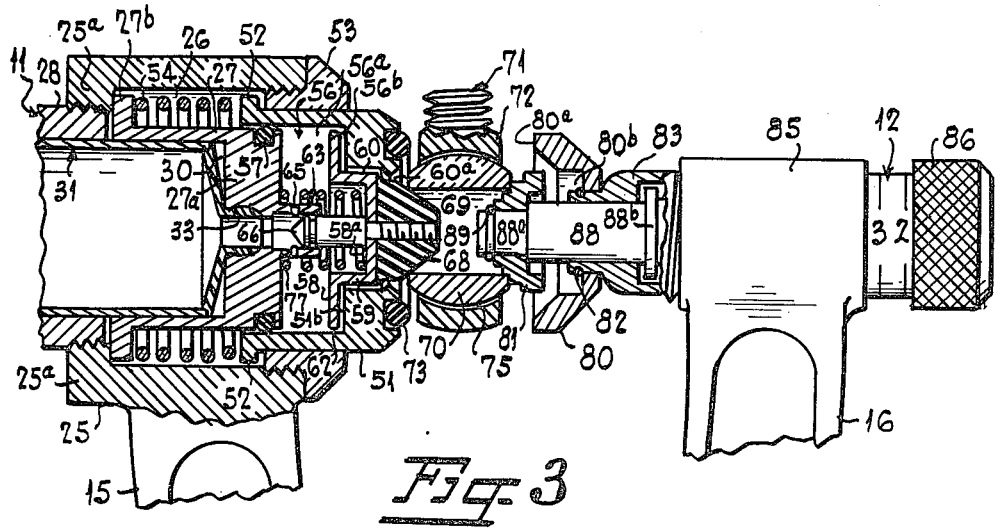
FIGURE 3 is an enlarged view of a portion of the lubricator, partly in elevation and partly in section, and showing the relative positions of the component parts of a plain rod end bearing and of the lubricator during the initial stage of clamping.

The present invention is composed of three major assemblies, namely, a clamp assembly 10, an injector head assembly 11, and a pressure head assembly 12. Although a hand-operated clamping assembly is illustrated, it is evident that various other types of clamping devices may be employed without departing from the spirit of the invention.

The numerals 13 and 14 denote the handles of clamp assembly 10, said handles being connected to arms 15 and 16 by means of a joint mechanism consisting of pivots 17, 18, 19 and 20. This mechanism is constructed and arranged in a well-known manner to transmit the relative movement between the handles to arms 15 and 16 and the respective injector head and pressure head assemblies 11 and 12 to cause the latter to move toward and away from each other.

The upper end of arm 15 has integral therewith an injector head casing 25 having a bore 26 therein in which a bulkhead piston 27 is mounted. The left-hand end of casing 25 (FIGURE 2) has one end of a cylindrical casing 28 threadably secured therein, the latter casing being provided with a bore 29 which is aligned with but smaller than the bore 26 of bulkhead piston 27. Piston 27, in turn, has a bore 30 therein which is also aligned with bore 29, the two bores being adapted to receive a lubricant or grease supply cartridge 31 (FIGURE 2C).

Cartridge 31 is composed of a hollow rigid-walled tube having a resilient end closure 32 provided with a resilient snout or outlet 33 through which lubricant is expelled to replenish an exhausted supply of lubricant to the lubricator reservoir to be described later. Snout 33 has a convex outer surface adapted to be inserted into a concave bore 35 in the end wall 27a of piston 27 (FIGURES 2, 2A and 2B). Since the snout is made of resilient material and has an outside diameter greater than the restricted entrance of concave bore 35, the snout is compressed when inserted through the bore entrance and will expand when completely inserted so as to initially lock the snout in position. During a lubrication operation, the lubricant pressures within snout 33 further expand the latter within concave recess 35 to form a sealed connection thereby locking the cartridge 31 in position relative to the end wall 27a of bulkhead piston 27. The degree of locking action is in direct proportion to the lubricant pressures.

Cartridge 31 is also provided with a lubricant follower disk 36 slidably mounted in the cartridge end opposite snout 33, said disk serving as a seal to prevent escape of lubricant 34 during a lubrication operation, and further serving as a barrier for preventing contamination of the lubricant during shipping and storage of the cartridge. As a further means of preventing contamination, suitable snap-on caps 37 and 38 are removably secured over the respective snout and disk ends of the cartridge.

For reasons explained more fully hereinafter, it is necessary to provide a mechanism capable of exerting a relatively low constant pressure upon the lubricant 34 in cartridge 31. This low pressure mechanism comprises a piston or thimble 44 adapted to contact follower disk 36 under the expanding pressure of one end of a spring 45, the other end of said spring abutting end wall 28a of casing 28 to confine the spring in bore 29.

A shaft 46 slidably penetrates end wall 28a and has its inner end attached to piston 44, the outer end of shaft 46 having an operating knob 49 secured thereon. It will be observed that shaft 46 may be latched in retracted position as shown in FIGURE 2, thereby relieving follower disk 36 and the lubricant 34 in cartridge 31 from pressure. This latching mechanism also serves to provide the necessary clearance in bore 29 to permit a cartridge 31 to be loaded or unloaded without exerting pressure upon the lubricant.

Shaft 46 has a D-shaped cross-section which slidably fits in a D-shaped opening 47 in the casing end wall 28a when the shaft is in released or partially released position as shown in FIGURE 1A. In released position, the flat side 46b of shaft 46 slidably engages the flat side 47a of the D-shaped opening 47 at which time the spring 45 forces piston 44 against follower disk 36. When it is desired to latch shaft 46 and the attached piston 44 in retracted position as shown in FIGURE 2, a peripheral groove 46a in shaft 46 is caused to coincide with D-shaped opening 47. In this coinciding position, the flat side 46b of the shaft can be rotated to a non-parallel and non-contacting position relative to the flat side 47a of the D-shaped opening 47 to cause the outermost wall of groove 46a to become interlocked with casing end wall 28a to 47a as shown in FIGURE 2. FIGURE 1A shows shaft 46 in a released non-rotatable position.

When in a released position, the shaft 46 extends outside eof casing end wall 28a to an extent governed by the amount of lubricant or grease 34 in cartridge 31, said amount being indicated by the visible numerical indicia 48 of the scale on shaft 46.

The grease in cartridge 31 flows into a reservoir 56 on the interior of an outer piston 51 during periods which alternate with the lubrication of successive bearings and for the purpose of replenishing the lubricant expelled from the reservoir during the immediately preceding lubricating operation. Piston 51 has a peripheral flange 52 integral with the left-hand end thereof (FIGURE 2), said flange fitting in the bore 26 of injector head casing 25. A nut 53, threadably secured in the end of casing 25, slidably supports the outer periphery of piston 51, the inner end of said nut being engageable by the proximate face of flange 52 to limit the outward movement of the piston.

One end of a compression spring 54 engages the opposite face of flange 52 from the face engaged by nut 53, said spring normally urging piston 51 toward the nut and consequently toward pressure head assembly 12. The other end of spring 54 abuts a peripheral flange 27b of the bulkhead piston 27 to yieldingly hold the latter in retracted position and against the end wall 25a of casing 25.

Piston 51 is provided with reservoir bore 56 as mentioned above. This bore telescopically fits around the closed end 27a of bulkhead piston 27 and therefore has a variable volume depending upon the relative position of the pistons 51 and 27. A sealing ring 57 is disposed between the inner opposed surfaces of pistons 51 and 27 to prevent escape of lubricant from the reservoir bore 56 into bore 26.

Bore 56 is divided into lubricant reserve or receiving chamber 56a and a lubricant dispensing chamber 56b by a disk or baffle 58, said baffle having integral therewith a hub 59 mounted upon a rod or piston 66 which, in turn, is mounted for reciprocation in a sleeve 64 (FIG. 2B). Hub 59 reciprocates in a bore 60 formed in the end wall 51a of outer piston 51. The outside diameter of hub 59 is less than the inside diameter of bore 60 thereby providing an annular outlet through which lubricant and/or air flows to and from chamber 56b during expulsion and retraction of the forward end of the grease column by the apparatus. The outer end of hub 59 is adapted to engage a restricted portion 60a of bore 60 to limit the outward movement of the hub and attached baffle as shown in FIGURE 2, and further, to constitute a valve or seal that prevents possible grease contamination as explained in previous parent applications.

Cartridge 31, chamber 56a and chamber 56b are connected in series. The flow of lubricant between cartridge 31 and chamber 56a is controlled by a combination feed, spill and check valve assembly 63. The flow of lubricant and/or air, between chambers 56a and 56b is controlled by an annular passageway 62 of predetermined cross-sectional area so as to prevent lubricant flow therethrough below a specified lubricant pressure, said passageway being bounded by the outer periphery of baffle 58 and the proximate inner periphery of reservoir bore 56. In current designs, lubricant will not flow through passageway 62 at pressures less than eight pounds. Such predetermined pressures, however, may be varied to conform to the desired design or working conditions.

Valve assembly 63 includes the hollow sleeve 64 which is integral with end wall 27a of bulkhead piston 27. The intermediate portion of sleeve 64 has radially disposed bores 65 therein through which lubricant flows back and forth between cartridge 31 and chamber 56a during operation of the lubricator, said bores being closable by one end of the piston or rod 66 during its reciprocation in the sleeve. A sealing ring 67 is disposed between the inner opposed surfaces of sleeve 64 and piston 66 to prevent escape of lubricant (FIGS. 2A and 2B).

The other end of rod or piston 66 projects from sleeve 64 and has the previously mentioned baffle plate 58 secured thereon. A resilient conical member 68 is also threadably secured upon the right-hand end of this rod (FIGURE 2).

Figure 4:
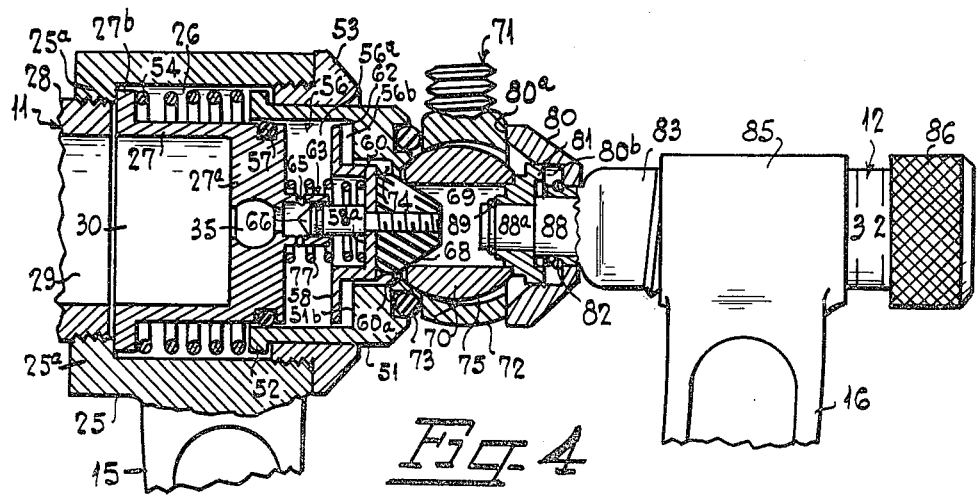
FIGURE 4 is a view similar to FIGURE 3, but showing the relative position of parts after the bearing has been further clamped to pre-lube full contact position.
Figure 5:
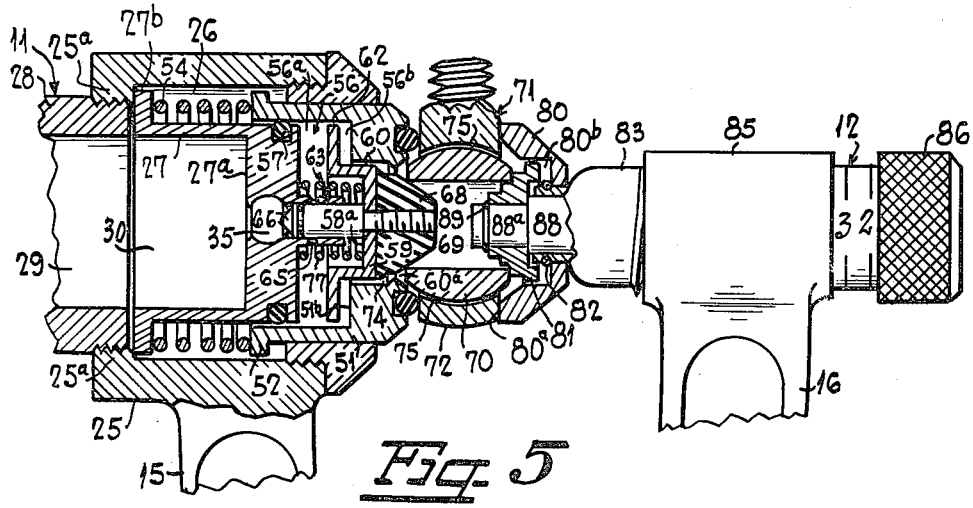
FIGURE 5 is a view similar to FIGURES 3 and 4 but showing the relative position of parts after the bearing has been further clamped so that the pressures will hold the bearing ball in mean central position within the socket.
Figure 6:
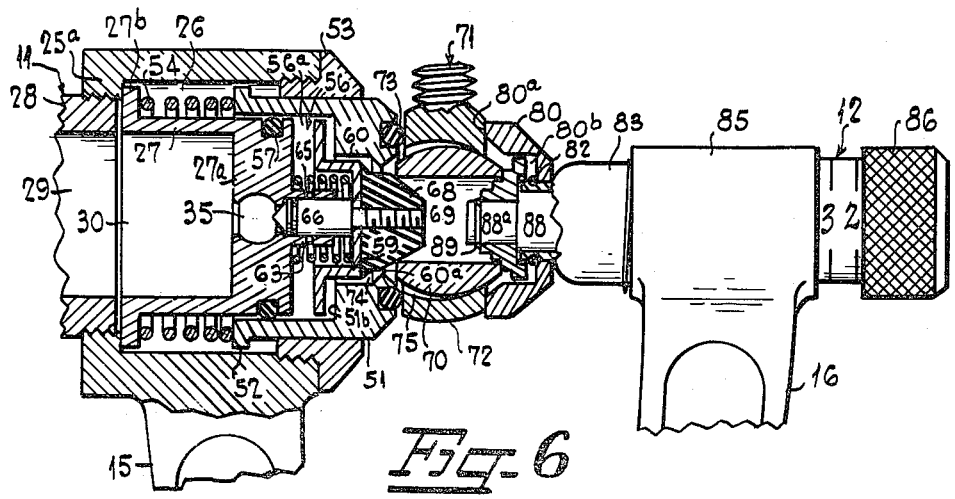
FIGURE 6 is a view similar to FIGURES 3, 4 and 5, but showing the relative position of the parts when the bearing is in fully clamped position.

It will be observed in FIGURES 3 through 6 that conical member 68 is adapted to close and seal one end of an axial bore 69 in the inner member 70 of a bearing 71 during the alignment and subsequent lubrication of the bearing. Likewise, a sealed connection is formed between the face of the bearing socket 72 and the outer piston 51 by means of a resilient ring 73. The adjacent end of clearance 75 between the inner and the outer portions of the bearing is adapted to communicate with the space between the inner and outer sealed connections as described above. Thus, the respective inner and outer sealing members 68 and 73, when pressed against one face of bearing 71 as shown in FIGURES 5 and 6, forms an adjacent annular conduit 74 which connects annular bore 60 to one end of clearance 75. As will be noted later, the passageway comprising cartridge 31, valve 63, reservoir 56, and conduits 60 and 74, will vary in length at various stages of the clamping pressures.

In FIGURES 3 through 6, a plain rod end bearing is illustrated. It should be understood, however, that this device effectively lubricates plain or antifriction rod ends, bearings, or pulleys (see FIGURES 7 and 8). During the early part of a lubricating operation and immediately preceding contact between outer bearing portion 72 and sealing member 73, the inner conical member 69 and its attached baffle 58 is caused to retreat from the position shown in FIGURE 2 to the positions shown in FIGURES 3 and 4, at which time, grease will flow from chamber 56a rearwardly through valve 62 into cartridge 31. Grease will also flow forwardly in smaller amounts through passageway 62 into chamber 56b in the event pressures exceeding the resistance of annular conduit 62 (e.g. eight pounds) should be built up in chamber 56a. Therefore, if sealing members 68 and 73 are in full contact position with a bearing as shown in FIGURE 4, the reservoir chamber 56b is filled with air except for the relatively small amount of grease which may have passed through conduit 62. The volume of the air in chamber 56b increases during the above-mentioned retreat of baffle 58 and its hub 59. The increased volume of chamber 56b is at least equal to, and usually greater than, the volume of grease which may flow from chamber 56a, through orifice 62 and into chamber 56b during said retreat; consequently, the volume of grease flow into chamber 56b will not spill from the latter into conduit 74 during the early part of a lubrication operation. Instead, the grease flowing into chamber 56b will merely displace an equal volume of air at a point remote from the outlet of the chamber.

A relatively weak compression spring 77 is disposed between bulkhead piston end 27a and baffle plate hub 59 and normally tends to urge the hub and atttached conical member 68 to extended position as shown in FIGURE 2 when a bearing is not present between the injector and pressure head assemblies 11 and 12.

The previously described injector head assembly 11 cooperates with pressure head assembly 12 to align, clamp and lubricate the bearing 71 during which the component parts of the bearing and lubricator successively occupy the positions shown in FIGURES 3 through 6.

The pressure head assembly 12 is provided with inner and outer contact member 81 and 80 which respectively oppose the pressures of sealing member 68 and 73 of the injector head assembly 11. The member 80 is cup-shaped and is mounted for limited universal movement as at 82 upon the end of a supporting casing 83 so that the cup rim 80a can adjust itself to the proximate face of the bearing socket 72 during a clamping cycle. Except for the above-mentioned limited universal movement, the contact member 80 is rigidly attached to casing 83.

Contact member 80 is provided with a recess 80b for receiving a part of stepped contact member 81 when the latter is forced to retracted position by clamping pressures as shown in FIGURES 4 through 6.

During operation of the lubricator, the rim 80a makes forcible contact with the proximate face of bearing socket 72 and thereby presses the opposite face of the socket firmly into engagement with outer sealing ring 73 mounted in end wall 51a of the injector head assembly. Also the stepped contact member 81 of the pressure head assembly makes forcible contact with the proximate face of bearing ball 70 to press the latter into engagement with conical member 68 of the injector head assembly, said conical member fitting into axial bore 69 of the socket to completely close it.

In order to prevent a pressure build-up within cup-shaped contact member 80 during the lubrication of a bearing, one or more notches 80c are provided in the rim 80a (FIGURES 1 and 1B), which notches serve as vents for air and excess lubricant flowing from clearance 75.

Casing 83 of the pressure head assembly is threadably secured in a sleeve or casing 85 integral with the upper end of clamp arm 16, the outer end of casing 83 having integral therewith a knurled knob 86 by which the casing and associated contact members 80 and 81 are adjusted relative to the contact members 73 and 68 of the injector head assembly to accommodate bearings of various widths. The degree of adjustment is indicated by the visible portion of a scale 87 and its associated numerical indicia on the periphery of the casing 83.

The stepped inner contact member 81 is secured on a restricted end portion 88a of shaft 88 by suitable means such as lock ring 89, the intermediate portion of said shaft being slidable as at 90 in casing 83 and the inner end of the shaft projecting into an enlarged bore 91 in the casing.

Shaft 88 has integral with the intermediate portion thereof a collar 88b which is adapted to engage the lefthand of bore 91 (FIGURE 2) to limit the inward axial movement of the shaft relative to casing 83. Outward axial movement of shaft 88 relative to casing 83 is limited by engagement of the end of the casing with the proximate face of stepped contact member 81.

The foregoing description of FIGURES 3 through 6 sets forth the invention when used to lubricate a plain rod end bearing. It should be understood, however, that my invention also may be employed to effectively lubricate other bearing types such as antifriction rod ends, bearings or pulleys.

In FIGURES 7 and 8, for example, the lubricator is shown in operative or full-contact position respectively with two general applications of antifriction units.

FIGURE 7 shows an antifriction ball-type rod end bearing 95 which comprises inner and outer portions 96 and 97 respectively, said portions being separated by an annular space 98 in which balls 99 are mounted. Dirt seals 100 are provided to close opposite ends of clearance 98. Upon the application of suitable pressures by the lubricator, lubricant and/or a mixture of lubricant and air may be forced by the seals into clearance 98.

FIGURE 8 shows an antifriction ball-type pulley assembly which comprises an antifriction ball-type bearing 103 inserted and staked in a metal sleeve 104, which sleeve is secured to pulley 105.

Although the inner and outer bearing members in FIGURES 7 and 8 are separated by balls, it is evident that roller-type inserts, or plain ball-and-socket bearing inserts could be substituted without affecting the lubricating efficiency of the lubricator.

GENERAL OPERATION OF THE LUBRICATOR

I. Loading

Loading is performed without a bearing engaged between the pressure head and injector head assemblies. During the loading, piston 51 of the injector head assembly 11 is fully extended due to the thrust of spring 54; and baffle hub 59 is fully extended due to the thrust of spring 77.

To load the lubricator, spring 45 is latched in compressed position and with shaft 46 retracted as shown in FIGURE 2, after which the magazine casing 28 is unscrewed from casing 25. Then the shipping seals 37 and 38 are removed from a grease-filled cartridge 31 (FIGURE 2C) and the cartridge inserted into bore 30 of bulkhead piston 27, the spherical cartridge snout 33 fitting into the spherical opening 35 of piston wall 27a. Next, the casing 28 is re-connected to casing 25 and spring 45 is released by rotating shaft 46 to unlatched position as shown in FIGURE 1A thus permitting the shaft to slide longitudinally inwardly.

The above-described loading operation produces the following events: Thrust spring 45 exerts a relatively low pressure on thimble 44, follower 36 and the lubricant 34 in cartridge 31. The lubricant is thereby forced through cartridge snout 33, through sleeve 64 and orifices 65 of combination valve 63, and then into reservoir chamber 56a. This flow of lubricant continues until baffle 58 is contacted with chamber 56a substantially full. Since baffle 58 forms an annular barrier beyond which lubricant 34 under a predetermined pressure will not flow (for example, a pressure of eight pounds), the chamber 56b will remain empty or filled with air. Due to spring pressure, the baffle 58 and its hub 59 and the outer piston 51 remain fully extended during the loading operation to thereby hold combination valve 63 open with substantially equal lubricant pressure in cartridge 31 and chamber 56a.

Prior to a lubricating operation, the lubricator should be adjusted to fit the size of bearing to be lubricated. The scale or index marking 87 on casing 83 of pressure head assembly 12 is employed to obtain the proper setting. Turning knob 85 varies this setting.

II. *Bearing lubrication*

The bearing to be lubricated is placed between the injector head and pressure head assemblies 11 and 12 and handles 13 and 14 compressed to cause the bearing to be clamped during which the following sequence of events takes place:

(A) As illustrated in FIGURE 3, the inner bearing member or ball 70 is first contacted by the inner sealing member or cone 68 of the injector head assembly 11 and simultaneously by the stepped inner contact member 81 of the pressure head assembly 12. This two-point initial contact aligns the lubricator to the bearing and insures precision placement of the bearing in preparation for further alignment of the outer bearing portion described below. It should be noted also that the inner piston or baffle hub 59 retreats slightly into reservoir 56 during the initial clamping of the inner bearing portion, causing some lubricant in reservoir chamber 56a to flow reversely through valve 63 into cartridge 31; and in the event the retreat builds up pressures in chamber 56a exceeding the resistance of passageway 62, a lesser amount of lubricant may flow into and displace air within chamber 56b.

(B) As illustrated in FIGURE 4, contact is next made on the outer bearing portion or socket 72 by engagement of ring 73 and cup-shaped contact member 80. The space or clearance 75 between bearing portions 70 and 72 is thus sealed at the injector head side early in the clamping operation and the bearing portions themselves properly aligned with each other and with the lubricator. The importance of this early sealing will be discussed later.

The foregoing operation of the lubricator produced the following changes within the injector head assembly 11:

The inner piston or baffle hub 59 retreated into grease reservoir 56, the amount of such retreat prior to engagement of the bearing socket by members 73 and 80 depending upon the diameter of bore 69 in the bearing ball. This retreat of piston 59 caused retreat of baffle 58 and, consequently, the displacement of grease rearwardly from the chamber 56a into cartridge 31, and in some instances, forwardly into chamber 56b. Examination of FIGURE 4 will disclose that up to this point in the lubricating cycle the combination valve 63 has not closed; however, sealing members 68 and 73 have engaged the face of the bearing adjacent the injector head to trap the air outlet conduit 74 which consists of clearance 60 and orifice 60a. As stated above, a portion of the lubricant displaced by backward travel of piston 59 and baffle 58 up to this point in the cycle has been returned to cartridge 31 through valve 63, while the remaining displaced lubricant displaces volume of air in chamber 56b which does not exceed the total volume of the chamber.

By controlling the clearance 62 between the periphery of baffle 58 and the inside wall of reservoir bore 56, the pressure required to force grease through this annular clearance can be predetermined. For example, the clearance 62 may be such that eight pounds pressure will prevent passage of grease from chamber 56a to chamber 56b while higher operating pressures will force the grease through the clearance. This arrangement controls the amount of grease and air contained in chamber 56b when valve 63 is first closed. This control of the grease and air content is essential to efficient operation as will be discussed later. At the moment of closing of valve 63, there is no air in chamber 56a.

(C) Because outer contact member 80 is unyieldingly attached to arm 16, further closing of the clamping mechanism will force the clamped bearing 71 toward the injector head assembly 11, and this movement of the bearing will force spring-loaded piston 51 and spring-loaded baffle hub 59 backwardly to further decrease the volume of reservoir chamber 56a. The grease contained in chamber 56a will continue to spill through valve 63 into cartridge 31 until, at a predetermined point in the backward travel of baffle hub 59, the resilient sealing ring 67 retreats beyond orifice 65 (FIGS. 2A, 2B, 5 and 6). During a clamp closing operation, the volume of dispensing chamber 56b is established at the moment both inner and outer seals 68 and 73 make contact with the bearing face. This volume remains constant. The receiving chamber 56a is different; it decreases in volume constantly from the moment the inner sealing member 68 contacts the inner bearing portion, such decrease being accelerated following contact of the outer bearing portion by the outer seal 73.

Further backward travel of members 51 and 59 after valve 63 is closed will pressurize the grease and air contained in the reservoir chambers 56a and 56b, and the amount of such pressure will be proportional to the backward travel.

(D) Pressure thus generated in reservoir 56 and outlet conduit 74 will react in the following manner (FIGURE 2):

(1) Operating pressures will overcome the resistance to the free flow of grease through annular channel 62, resulting in a flow of grease from chamber 56a to 56b.

(2) Pressures within chamber 56a will act upon end wall 27a (FIGURE 4) of bulkhead piston 27 and will tend to force this unit backwardly but movement will be prevented by inturned shoulder 25a.

(3) Pressures within chamber 56a will react upon surface 58a of baffle hub 59 (FIGURE 2) and will tend to move this piston forwardly with a thrust proportional to such pressures.

(4) Pressures within chamber 56b will react upon surface 51b (FIGURE 2) and tend to urge piston 51 forwardly with a thrust proportional to such pressures.

With the bearing 71 properly clamped and alined, and with the reservoir chambers 56a and 56b in communication with bearing clearance 75 through connecting conduit 74 as shown in FIGURES 5 and 6, the higher pressures in reservoir 56 will cause the mixed grease and air to flow into annular channel 75 between the inner and outer members of the clamped bearing.

In lubricating plain rod end bearings with lubrication apparatus such as disclosed in my copending patent application Serial No. 229,693, Patent No. 3,158,227, it is sometimes necessary to repeatedly compress and decompress the hand clamp to a oscillate the inner bearing member relative to the outer bearing member, constituting a pump-like action. In the apparatus disclosed in this application, only one oscillating movement is necessary in most lubricating operations on account of the automatic control of the volume of grease in reservoir 56 and the more precise applications of grease-air pressures synchronized to the initial oscillating stroke of the inner bearing member. Hence, a bearing usually needs to be clamped only once to give complete lubrication. If, however, a bearing should require application of intermittent greasing pressures, the present apparatus may be manipulated to produce this effect as set forth in detail in my copending patent application Serial No. 229,693. In other words, axial movement of the inner bearing portion relative to the outer portion aids, and in some instances makes possible, the lubrication of a plain type bearing. Basic operation of the lubricator however is not affected by this relative axial movement.

Upon release of the clamping mechanism after a lubricating cycle, little or no grease remains in the reservoir chamber 56b because of the vacuum created within the reservoir by the sudden forward movement of pistons 51 and 59 thereby sucking the grease from conduit 74 and chamber 56b back into chamber 56a. It will be observed that this forward movement of the pistons occurs, in part, while combination valve 63 is closed and orifice 60a open. During the relase of the clamping mechanism, as stated above, the lubricator component parts shift from the position shown in FIGURE 6 to that shown in FIGURE 2.

Although the clearance between the inner and outer races of both plain and antifriction bearings most always offers enough resistance to initially trap air in conduit 74 and chamber 56b when full clamping contact is established with the bearing, and regardless of the relative axial portions of the inner and outer bearing portions, the lubricator will operate efficiently where little or no resistance is offered. In operation, the bearings with low internal resistance are usually easier to lubricate.

The drawings illustrate and the above specification describes the performance of the lubricator while lubricating a bearing in which the opening 69 of inner bearing portion 70 is sufficiently large to permit the outer bearing portion 72 to be clamped between members 73 and 80 before the lubricant supply valve 63 is closed. It is evident from the disclosure, however, that the lubricator will function equally as well where the opening 69 is small enough to cause valve 63 to close simultaneously with, or prior to, contact between members 72, 73 and 80, provided however, that the volume of grease expelled from chamber 56a, through opening or orifice 62 and into chamber 56b subsequent to the valve closing and before the contact does not exceed the volume of chamber 56b. For example, if the diameter of bore 69 should be only one-half of that shown in FIGURE 3, the inner piston assembly comprising cone seal 68, baffle 58, hub 59, valve shaft 66 and O ring 67 would be moved much farther to the left than shown to thereby close valve 63 before the outer bearing portion 72 is clamped; and during this initial clamping movement, the air in chamber 56b would be increased accordingly along with the increased volume thereof. After valve 63 becomes closed, grease would then begin to spill forwardly into chamber 56b instead of rearwardly through valve 63 during the further clamping immediately preceding the contact of outer bearing portion 72 by members 73 and 80. It is therefore evident that the duration of such further clamping is limited by the capacity of chamber 56b in order to insure that grease will not be expelled at the chamber outlet before both the inner and outer bearing portions are clamped.

In the drawings and specification a preferred embodiment of invention has been set forth, and although specific terms are employed they are used in a generic sense and not for the purpose of limitation, the scope of invention being defined in the following claims.

I claim:

1. In an apparatus for lubricating a bearing provided with inner and outer relatively rotatable bearing portions, said portions having a clearance therebetween extending substantially coaxially with the axis of rotation of the bearing, means for clampingly engaging said outer bearing portion substantially alined with said axis, means cooperating with said clamping means for forming a reservoir, means for dividing said reservoir into complementary receiving and dispensing chambers, said latter chamber having an outlet, conduit means connecting said chambers and operable to stop and permit lubricant flow therethrough respectively below and above a predetermined lubricant pressure, means including said conduit means for confining lubricant in said receiving chamber, a second clamping means operable to clampingly engage said inner bearing portion along said axis in advance of said engagement between said first clamping means and outer bearing portion, means for reciprocably mounting at least a portion of said second clamping means in said reservoir and outlet, said dividing means being connected to said reciprocably mounted portion, means responsive to the initial clamping pressures of said second clamping means for moving said reciprocably mounted portion and connected dividing means inwardly of said reservoir and outlet to increase the volume of said dispensing chamber and to correspondingly decrease the volume of said receiving chamber, means operable upon completion of said initial clamping pressures for connecting said outlet to said bearing clearance, and means responsive to the combined pressures of said first and second clamping means for applying pressures in excess of said predetermined pressure to the lubricant in said receiving chamber to thereby cause the lubricant to flow through said conduit, dispensing chamber, connecting means, and into said bearing clearance.

2. Lubrication apparatus as defined in claim 1 and further comprising: a lubricant supply cartridge connected to said receiving chamber, a normally open valve in the latter connection, and means alternately operable with said flow of lubricant into said clearance for opening said valve to admit lubricant into the receiving chamber.

3. Lubrication apparatus as defined in claim 1 and further comprising: suction means operable upon release of said clamping pressures for reversing the direction of said lubricant flow in said connecting means.

4. Lubrication apparatus for bearings comprising: a lubricant reservoir having a pair of chambers therein, means for supplying lubricant under pressure to one of said chambers, the other of said chambers having an outlet, means for clamping said chamber outlet against said bearing, conduit means connecting said chambers and operable to stop and permit flow of lubricant therethrough respectively below and above a predetermined pressure greater than said supply pressure, means responsive to pressures in excess of said predetermined pressure to cause lubricant to flow into said other chamber, through said conduit means and to said bearing, suction means operable upon release of said clamping pressures for reversing the direction of lubricant flow through said conduit means whereby lubricant will be withdrawn from said outlet into said other chamber, a valve for controlling the flow of lubricant between said supply means and said first-named chamber, and means responsive to said clamping pressures and alternately operable with the flow of lubricant to said bearing for closing said valve.

5. Lubrication apparatus for bearings comprising: a lubricant reservoir having a pair of chambers therein, means for supplying lubricant under pressure to one of said chambers, the other of said chambers having an outlet, means for clamping said chamber outlet against said bearing, conduit means connecting said chambers and operable to stop and permit flow of lubricant therethrough respectively below and above a predetermined pressure greater than said supply pressure, means responsive to pressures in excess of said predetermined pressure to cause lubricant to flow into said other chamber, through said conduit means and to said bearing, a valve for controlling the flow of lubricant between said supply means and said first-named chamber and means responsive to said clamping pressures and alternately operable with the flow of lubricant to said bearing for closing said valve.

6. In an apparatus for lubricating a bearing having normally concentric ball and socket portions with a clearance therebetween extending through and coaxially with the axis of rotation of the bearing, said ball portion being movable in opposite directions along said axis from its concentric position against said socket portion to respectively close the opposite ends of the clearance, the combination of a lubricant reservoir having a receiving and a dispensing chamber therein, conduit means connecting said chambers and operable below a predetermined pressure to prevent the flow of lubricant therethrough, clamping means individual to each of said bearing portions and relatively movable along said axis, means for confining lubricant in said receiving chamber below said predetermined pressure, means operable upon the clamping of said bearing portions for effecting said relative movement of the clamping means to move said ball portion to closed position over one end of said clearance, means operable concurrently with said last-named means for connecting said closed clearance end with said dispensing chamber to trap the air in the latter, means for subjecting said chambers to pressure greater than said predetermined pressure to force lubricant through said conduit from the receiving chamber to the dispensing chamber and into a compressed mixture, and means responsive to said compressed mixture for effecting relative movement between said clamping means to move said ball from its closed position to permit the compressed mixture to flow from the dispensing chamber into the clearance.

7. Lubrication apparatus comprising: a piston having an open-ended reservoir therein, closure means slidably mounted in said open end of the reservoir, movable means for dividing said reservoir into complementary reserve and dispensing chambers, said dispensing chamber having an outlet and said closure means coacting with said movable means to confine lubricant in the reservoir chamber under pressure, conduit means connecting said chambers and operable below a predetermined pressure to prevent the flow therethrough of lubricant from said reserve chamber, and means including said closure and movable means for subjecting said confined lubricant to pressure in excess of said predetermined pressure whereby the lubricant will flow from said reserve chamber and through said conduit means, dispensing chamber and outlet.

8. Lubrication apparatus as defined in claim 7 and further comprising: means operable upon release of said excess pressure for generating a reduced pressure in said reserve chamber to reverse the direction of flow of said mixture in said outlet and dispensing chamber.

9. A self-contained lubricator for bearings comprising: a reservoir, a lubricant supply cartridge, a normally open valve for controlling the flow of lubricant between said reservoir and cartridge, means for pressing said reservoir against said bearing, and means responsive to said last-named means for closing said valve and for concurrently forcing lubricant from the reservoir into the bearing.

10. A self-contained lubricator according to claim 9 and further comprising: a piston slidably mounted in said cartridge for confining lubricant in the latter, means for yieldably pressing said confined lubricant toward said valve, and means movable with said piston for indicating the amount of lubricant in the cartridge.

11. In an apparatus for lubricating a bearing provided with inner and outer relatively rotatable bearing portions, said portions having a clearance therebetween extending through said bearing, means for clamping the inner and outer bearing portions in alignment with their respective rotational axes and at right angles to a common plane comprising the combination of: a pair of spaced relatively movable members for clamping said outer bearing portion along its rotational axis, a second pair of spaced clamping members respectively mounted for movement upon said first clamping members for clamping said inner bearing portion along its rotational axis, the clamping means for said inner bearing portion comprising a pair of spaced reciprocable members and the clamping means for said outer bearing portion comprising a second pair of spaced members respectively supporting said first pair of reciprocable members, and means for adjusting the position of one of said supporting members and its supported reciprocable member relative to the other supporting and supported members whereby the spaces between said members may be varied to accommodate a range of bearing sizes.

12. Lubrication apparatus as defined in claim 11 and further comprising: means for indicating the amount of said adjustment.

13. Lubrication apparatus for bearings comprising: a lubricant reservoir, movable means for dividing said reservoir into a pair of complementary reserve and dispensing chambers, said dispensing chamber having an outlet, means for clamping said outlet in communication with the interior of said bearing, conduit means connecting said chambers and operable to stop and to permit flow of lubricant therethrough respectively below and above a predetermined pressure, and means including said dividing means and responsive to said clamping means for diminishing the volume of said reserve chamber to thereby generate lubricant pressures in the latter in excess of said predetermined pressure whereby lubricant will be caused to flow from said reserve chamber, through said conduit means, into said dispensing chamber and into said bearing.

14. Lubrication apparatus as defined in claim 13 and further comprising: means operable upon release of said clamping pressures for increasing the volume of said reserve chamber to thereby generate within the latter a reduced pressure whereby the direction of lubricant flow through said conduit means and said dispensing chamber will be reversed.

References Cited by the Examiner
UNITED STATES PATENTS

| | | | |
|---|---|---|---|
| 2,396,124 | 3/46 | Pitisci | 184—1 |
| 2,427,233 | 9/47 | Shartle | 184—1 |

LAVERNE D. GEIGER, *Primary Examiner.*